(12) United States Patent
Lynn, Jr. et al.

(10) Patent No.: US 9,867,117 B2
(45) Date of Patent: Jan. 9, 2018

(54) NETWORK ADMISSION CONTROL

(71) Applicant: COMCAST CABLE COMMUNICATIONS, LLC, Philadelphia, PA (US)

(72) Inventors: Thomas William Lynn, Jr., Berryville, VA (US); Phillip A. Sanderson, Mt. Laurel, NJ (US); Joseph Attanasio, Philadelphia, PA (US); Yash Lachmandas Khemani, Falls Church, VA (US); James H. Davey, Jasper, GA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 35 days.

(21) Appl. No.: 14/341,418

(22) Filed: Jul. 25, 2014

(65) Prior Publication Data
US 2016/0029292 A1    Jan. 28, 2016

(51) Int. Cl.
*H04W 48/02* (2009.01)
*H04W 52/28* (2009.01)
*H04W 72/04* (2009.01)
*H04L 5/00* (2006.01)
*H04L 1/00* (2006.01)

(52) U.S. Cl.
CPC ........... *H04W 48/02* (2013.01); *H04L 1/0001* (2013.01); *H04L 1/0003* (2013.01); *H04L 5/0069* (2013.01); *H04L 5/0092* (2013.01); *H04W 52/28* (2013.01); *H04W 72/048* (2013.01)

(58) Field of Classification Search
None
See application file for complete search history.

(56) References Cited

U.S. PATENT DOCUMENTS

| | | | | |
|---|---|---|---|---|
| 7,840,221 B1* | 11/2010 | Kim | ...................... | H04W 16/08 455/422.1 |
| 2004/0196812 A1* | 10/2004 | Barber | ................... | H04W 88/08 370/334 |
| 2004/0246922 A1* | 12/2004 | Ruan | ..................... | H04W 48/20 370/331 |

(Continued)

FOREIGN PATENT DOCUMENTS

| | | |
|---|---|---|
| CA | 2898213 | 7/2015 |
| EP | 1494379 A1 | 1/2005 |

(Continued)

OTHER PUBLICATIONS

Cisco Wireless LAN Controller Configuration Guide, Release 7.4, Mar. 26, 2013, Cisco Systems, Inc. (1060 pages).

(Continued)

*Primary Examiner* — Kodzovi Acolatse
(74) *Attorney, Agent, or Firm* — Ballard Spahr LLP (57) ABSTRACT

Systems and methods for managing a network are disclosed. One method can comprise determining a first modulation rate associated with a network device. A beacon can be transmitted at a second modulation rate, wherein the second modulation rate is greater than the first modulation rate. A user device can be associated with the network device based on the beacon if the user device is configured to support the second modulation rate.

17 Claims, 7 Drawing Sheets

(56) References Cited

U.S. PATENT DOCUMENTS

| | | | |
|---|---|---|---|
| 2005/0171720 A1* | 8/2005 | Olson | H04W 12/12 702/121 |
| 2007/0014267 A1* | 1/2007 | Lam | H04W 48/10 370/338 |
| 2007/0248033 A1* | 10/2007 | Bejerano | H04W 16/08 370/318 |
| 2009/0232106 A1 | 9/2009 | Cordeiro et al. | |
| 2012/0094610 A1* | 4/2012 | Lunden | H04W 16/14 455/67.13 |
| 2012/0164948 A1* | 6/2012 | Narasimha | H04W 72/1215 455/63.1 |
| 2013/0266081 A1 | 10/2013 | Pande et al. | |
| 2014/0044118 A1 | 2/2014 | Kim et al. | |
| 2014/0098729 A1 | 4/2014 | Chhabra et al. | |
| 2014/0105037 A1* | 4/2014 | Manthiramoorthy | H04W 4/008 370/252 |
| 2014/0199958 A1 | 7/2014 | Hassan et al. | |
| 2015/0016281 A1* | 1/2015 | Jagetiya | H04W 72/0446 370/252 |
| 2015/0098354 A1* | 4/2015 | Perez Grovas | H04W 24/04 370/253 |
| 2015/0163753 A1* | 6/2015 | Valliappan | H04W 52/267 370/338 |
| 2016/0295367 A1* | 10/2016 | Yu | H04W 8/005 |

FOREIGN PATENT DOCUMENTS

| | | |
|---|---|---|
| EP | 15178331.3 | 7/2015 |
| KR | 20140009040 A | 1/2014 |
| WO | WO-2009/072761 A2 | 6/2009 |
| WO | WO-2013/054144 A1 | 4/2013 |
| WO | WO-2014/046576 A1 | 3/2014 |

OTHER PUBLICATIONS

Extended European Search Report and Written Opinion dated Apr. 13, 2016 for EP 15178331.3, filed on Jul. 24, 2015 and published as EP 2985938 on Feb. 17, 2016 (Applicant—Comcast Cable Comm., LLC // Inventor—Lynn, et al.) (28 pages).

* cited by examiner

NETWORK ADMISSION CONTROL

BACKGROUND

A network such as a local area network can comprise one or more network devices (e.g., access point (AP)) to provide a means for one or more user devices to communicate with and/or over the network. A network device can comprise a device that allows wired and/or wireless user devices to connect to a wired network using Wi-Fi, Bluetooth, or related standards. A network device can be configured to provide access to one or more services (e.g., private network, public network, network-related services). In certain Wi-Fi networks the AP can transmit a beacon. A user device can listen for this beacon to discover the AP availability in the local area. However, issues can arise when the user device discovers the presence of a WiFi network based on a perceived beacon strength, but the user device is unable to successfully connect and sustain a quality connection. For example, when the AP has a more powerful transmit power than the user device, this causes an asymmetric received signal strength indicator (RSSI) problem where the user device can receive and process the signal from the AP but the AP cannot receive and process the signal from the user device. Another problem is that the beacon is sent by the AP at the lowest configured rate at which the AP can transmit. Accordingly, improvements are needed for provisioning and managing devices connected to a network. These and other shortcomings are addressed by the present disclosure.

SUMMARY

It is to be understood that both the following general description and the following detailed description are exemplary and explanatory only and are not restrictive, as claimed. Methods and systems for managing network devices and providing services (e.g., network connectivity, broadband services, etc.) to one or more user devices or clients, are disclosed. The methods and systems described herein, in one aspect, can provide access to one or more services by one or more user devices or clients independent of the network to which the user devices are connected. In another aspect, the methods and systems described herein can dynamically configure a beacon transmission associated with a network device in order to selectively manage devices that are able to connect to the network device.

In an aspect, methods can comprise determining a first rate, for example, a first modulation rate and/or a first data transmission (e.g., transfer) rate, associated with a network device. A beacon can be transmitted at a second rate, for example, second modulation rate and/or a second data transmission (e.g., transfer) rate, wherein the second rate is greater than the first rate. A user device can be associated with the network device based on the beacon if the user device is configured to support the second rate.

In another aspect, methods can comprise determining a first transmit power associated with a network device. The first transmit power can relate to a data transfer rate supported by the network device. A beacon can be transmitted at a second transmit power. The second transmit power can be different, e.g., less, than the first transmit power. A user device can be associated with the network device based on the beacon if the user device is configured to receive the beacon.

In a further aspect, methods can comprise determining a first characteristic associated with a network device. The first characteristic can relate to one or more of a transmit power and a noise floor. A second characteristic associated with a user device can be determined. The second characteristic can relate to a received signal strength. An estimate of a quality of connectivity between the user device and the network device can be determined. The user device can be associated with the network device if the estimate of the quality of connectivity exceeds a threshold value.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The methods and systems described herein, in one aspect, can provide services (e.g., network connectivity, broadband services, etc.) to one or more user devices or clients. In another aspect, the methods and systems described herein can dynamically configure a beacon transmission associated with a network device in order to selectively manage devices that are able to connect to the network device. Other information relating to transmission and/or reception characteristics of the network device and/or a user device can be communicated between devices (e.g., connected devices, pre-connected devices) to determine a connection quality, such as an actual quality or estimated quality.

Figure 1:
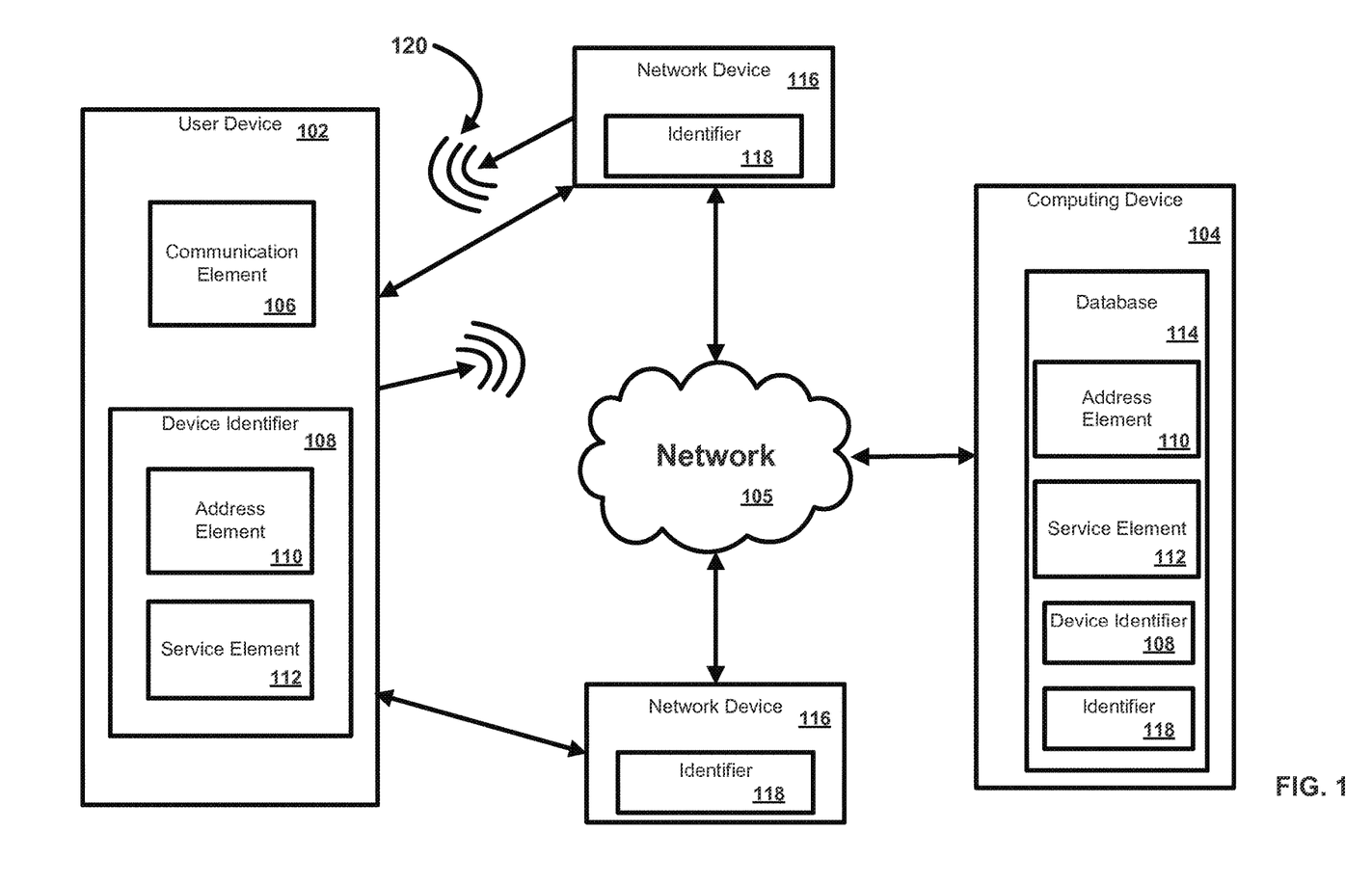
FIG. 1 is a block diagram of an exemplary system and network.

In one aspect of the disclosure, a system can be configured to provide services such as network-related services. FIG. 1 illustrates various aspects of an exemplary environment in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104, such as a server, for example. The computing device 104 can be disposed locally or remotely relative to the user device 102. As an example, the user device 102 and the computing device 104 can be in communication via a private and/or public network 105, such as the Internet. Other forms of communications can be used, such as wired and wireless telecommunication channels, for example.

In an aspect, the user device 102 can be an electronic device, such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving a user feedback, such as a application client or a web browser (e.g., Internet Explorer, Mozilla Firefox, Google Chrome. Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device, such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device, such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a MAC address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network and/or location.

In an aspect, the service element 112 can comprise an identification of a service provider associated with the user device 102 and/or with the class of user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. In an aspect, the address element 110 can be used to identify or retrieve the service element 112, or vise versa. As a further example, one or more of the address element 110 and the service element 112 can be stored remotely from the user device 102 and retrieved by one or more devices, such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources, such as data, devices, and files. As an example, the computing device can be configured as central location (e.g., a headend, or processing facility), which can receive content (e.g., data, input programming) from multiple sources. The computing device 104 can combine the content from the various sources and can distribute the content to user (e.g., subscriber) locations via a distribution system.

In an aspect, the computing device 104 can manage the communication between the user device 102 and a database 114 for sending and receiving data therebetween. As an example, the database 114 can store a plurality of data sets (e.g., mapped identifiers, relational tables, user device identifiers (e.g., identifier 108) or records, network device identifiers (e.g., identifier 118), or other information). As a further example, the user device 102 can request and/or retrieve a file from the database 114. In an aspect, the database 114 can store information relating to the user device 102, such as the address element 110 and/or the service element 112. As an example, the computing device 104 can obtain the device identifier 108 from the user device 102 and retrieve information from the database 114, such as the address element 110 and/or the service elements 112. As another example, the computing device 104 can obtain the address element 110 from the user device 102 and can retrieve the service element 112 from the database 114, or vice versa. As a further example, the computing device 104 can obtain a MAC address from the user device 102 and can retrieve a local IP address from the database 114. As such, the local IP address can be provisioned to the user device 102, for example, as the address element 110 to facilitate interaction between the user device 102 and a network (e.g., LAN). Any information can be stored in and retrieved from the database 114. The database 114 can be disposed remotely from the computing device 104 and accessed via direct or indirect connection. The database 114 can be integrated with the computing system 104 or some other device or system.

In an aspect, one or more network devices 116 can be in communication with a network, such as network 105. As an example, one or more of the network devices 116 can facilitate the connection of a device, such as user device 102, to the network 105. As a further example, one or more of the network devices 116 can be configured as a network gateway. In an aspect, one or more network devices 116 can be configured to allow one or more wireless devices to connect to a wired and/or wireless network using Wi-Fi, Bluetooth or similar standard.

In an aspect, the network devices 116 can be configured as a mesh network. As an example, one or more network devices 116 can comprise a dual band wireless network device. As an example, the network devices 116 can be configured with a first service set identifier (SSID) (e.g., associated with a user network or private network) to function as a local network for a particular user or users. As a further example, the network devices 116 can be configured with a second service set identifier (SSID) (e.g., associated with a public/community network or a hidden network) to function as a secondary network or redundant network for connected communication devices.

In an aspect, one or more network devices 116 can comprise an identifier 118. As an example, one or more identifiers can be a media access control address (MAC address). As a further example, one or more identifiers 118 can be a unique identifier for facilitating communications on the physical network segment. In an aspect, each of the network devices 116 can comprise a distinct identifier 118. As an example, the identifiers 118 can be associated with a physical location of the network devices 116.

In an aspect, the user device 102 can discover a beacon 120 transmitted (e.g., wirelessly) by the network device 116. The beacon 120 can comprise a beacon frame. As an example, the beacon frame can comprise information relating to the network. As a further example, the beacon frame can comprise a timestamp to synchronize two or more devices (network device 116), a beacon interval at which a node (network device 116) must send a beacon; and capability information. The beacon 120 can comprise information to facilitate a connection between the user device 102 and the network device 116. In another aspect, a broadcast rate (e.g., data transmission rate, modulation rate) of the network device 116 can be configured at a custom rate. As an example, the beacon 120 transmitted by the network device 116 can advertise the minimum acceptable rate (e.g., data transmission rate, modulation rate) that is required to connect to the network device 116. As such, if a user device 102 is in range of the beacon 120, but is not able to demodulate the beacon 120, the user device 102 is unable to discover the network device 116 and may not be able to connect to the network device. As another example, if the network device 116 can support the following rates (in Mbps): 1, 2, 5.5, 11, 6, 9, 12, 18, 24, 36, 48, 54, the beacon 120 can be transmitted at 18 Mbps in order to reduce the circumference in which the beacon could be de-modulated. This would allow the user device 102 to use lower rates than 18 Mbps, but to not discover the broadcast and attempt connection until the user device 102 was able to de-modulate 18 Mbps. As another example, if the network device 116 can support the following rates (in Mbps): 7.2, 14.4, 21.7, 28.9, 43.3, 57.8, 65, 72.2, the beacon 120 can be transmitted at 21.7 Mbps instead of 7.2 Mbps in order to reduce the circumference that the beacon could be de-modulated. As a further example, the network device 116 may be configured to support various rates, such as less than or equal to 87.6 Mbps, less than or equal to 200 Mbps, less than or equal to 433.3 Mbps, less than or equal to 866.7 Mpbs, less than or equal to 6912 Mbps, or other rates or ranges. In an aspect, any rate can be used, such as rates allowed by governing agencies such as the Federal Communications Commission (FCC) and the like.

In a further aspect, the user device 102 may be required to be within a particular range of the network device 116 in order to discover the beacon 120. In an aspect, the network device 116 can configure a transmit power specifically for the beacon 120. As an example, the beacon 120 can be transmitted at a first transmit power that is lower than a second transmit power used for the transmission of network data. As a further example, data can be transmitted at a power of 23 dBm and the beacon 120 can transmit at a power of 15 dBm. This would reduce the area that a user device 102 could discover the broadcast of the beacon 120, but would not affect the actual data service area of the network device 116 for all devices.

In an aspect, various characteristics can be communicated between the user device 102 and the network device 116 to evaluate link quality. As an example, an RSSI associated with the user device 102 can be received by the network device 116 and can be returned to the user device 102. The user device 102 can use the returned RSSI to determine the quality of uplink and downlink for the connection between the user device 102 and the network device 116. As an example, information relating to a transmit power and/or a noise floor of the network device 116 can be transmitted to one or more user devices 102. Using this information about the network device 116 and/or the RSSI measured by the user device 102, the device can calculate a path loss. Knowing this path loss, the noise floor at the network device 116, and the characteristics of a transmitter of the user device 102, the user device 102 can calculate a quality of connectivity, such as the probability that its uplink will be received by the network device 116.

In an aspect, path loss can be calculated based on the transmission power ($P_{tx1}$) and an RSSI associated with the network device 16. As an example, path loss can be calculated based on $P_{tx1}-RSSI=L_p$ (path loss). In another aspect, a quality of connectivity (e.g., signal-to-noise ratio (SNR)) can be calculated based on the transmission power ($P_{tx2}$) associated with the user device 102, the $L_p$, and the noise floor (N) associated with the user device 102 or the network device 116. As an example, SNR can be calculated (e.g., estimated) based on $P_{tx2}$ (dBm)$-L_p$(dB)$-N$ (dBm)$=SNR$ (dB), wherein N can be associated with one or more of the user device 102 or the network device 116. Other functions and characteristics can be used to determine path loss and/or quality of connectivity.

Figure 2:
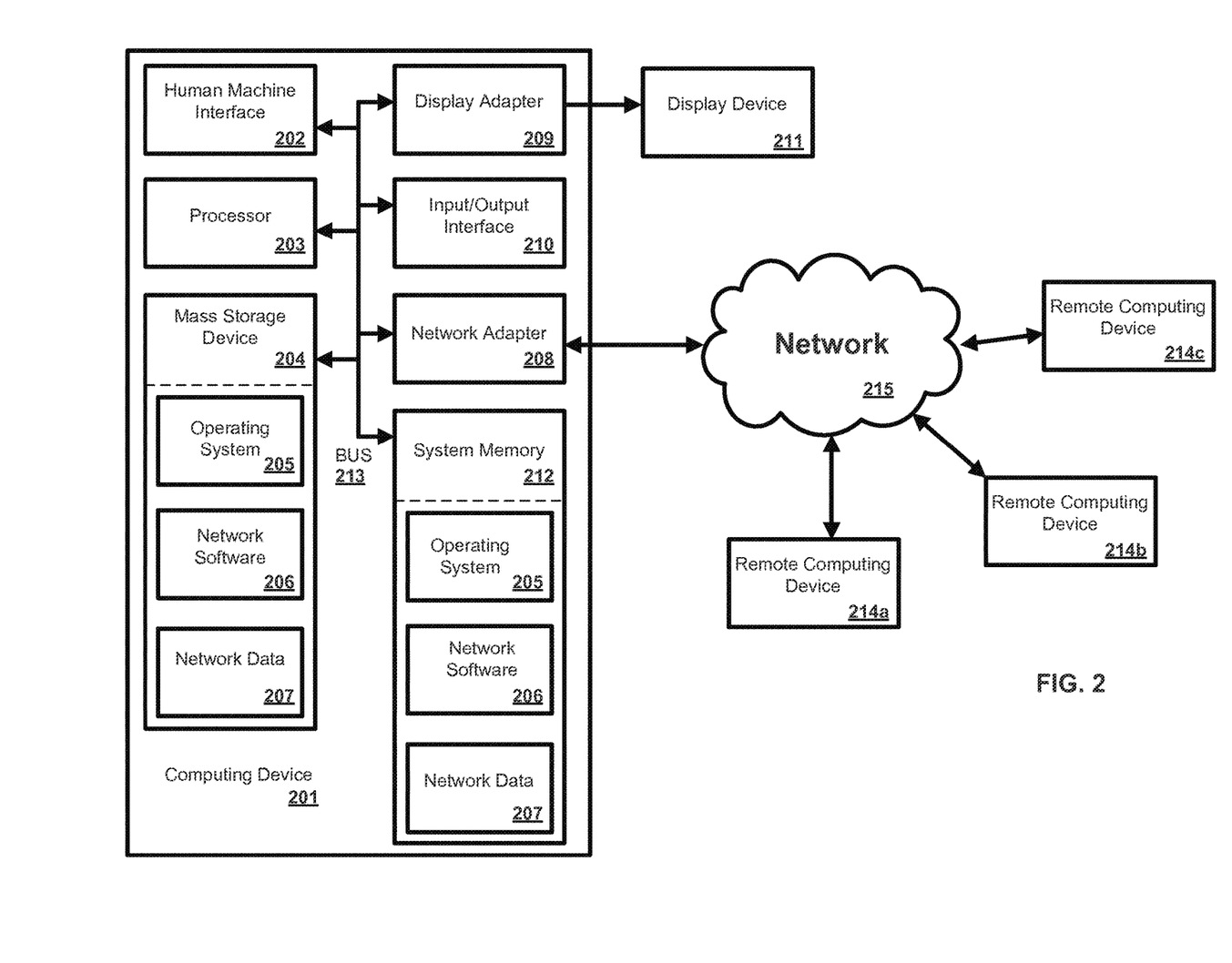
FIG. 2 is a block diagram of an exemplary computing device.

In an exemplary aspect, the methods and systems can be implemented on a computing system, such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, network software 206, network data 207, a network adapter 208, system memory 212, an Input/Output Interface 210, a display adapter 209, a display device 211, and a human machine interface 202, can be contained within one or more remote computing devices 214*a,b,c* at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data, such as network data 207, and/or program modules, such as operating system 205 and network software 206, that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards. CD-ROM, digital versatile disks (DVD) or other optical storage, random access memories (RAM), read only memories (ROM), electrically erasable programmable read-only memory (EEPROM), solid state drives, and the like.

Optionally, any number of program modules can be stored on the mass storage device 204, including by way of example, an operating system 205 and network software 206. Each of the operating system 205 and network software 206 (or some combination thereof) can comprise elements of the programming and the network software 206. Network data 207 can also be stored on the mass storage device 204. Network data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components, such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 205, are illustrated herein as discrete blocks, although it is recognized that such programs and components reside at various times in different storage components of the computing device 201, and are executed by the data processor(s) of the computer. An implementation of network software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
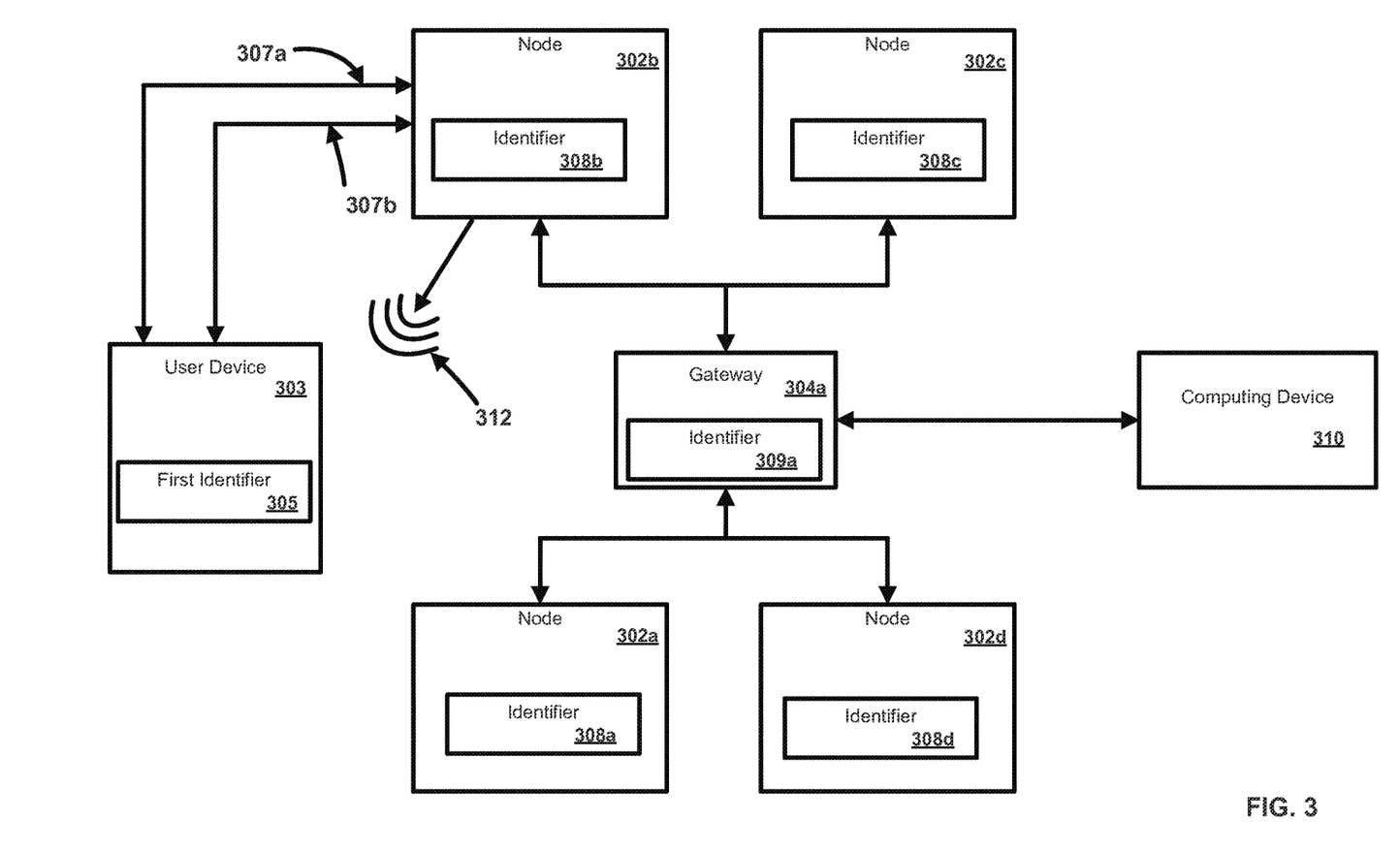
FIG. 3 is a block diagram of an exemplary system and network.

FIG. 3 illustrates an exemplary system and network. In an aspect, a plurality of nodes 302a, 302b, 302c, 302d can be in communication with one or more user devices 303 and a gateway 304a. As an example, one or more nodes 302a, 302b, 302c. 302d can be a network device, router, switch, communication device, or the like. As another example, one or more user devices 303 can be an electronic device, such as a computer, a smartphone, a laptop, a tablet, a set top box, a display device, or other device capable of communicating with one or more of the nodes 302a. 302b. 302c, 302d of the network.

In an aspect, the user device 303 can be associated with a first identifier 305, such as a user identifier or device identifier. As an example, the first identifier 305 can be any identifier, token, character, string, or the like, for differentiating one user or user device (e.g., user device 303) from another user or user device. In a further aspect, the first identifier 305 can identify a user or user device as belonging to a particular class of users or user devices. As a further example, the first identifier 305 can comprise information relating to the user device, such as a manufacturer, a model or type of device, a service provider associated with the user device 303, a state of the user device 303, a locator, and/or a label or classifier. Other information can be represented by the first identifier 305. In an aspect, the first identifier 305 can be an internet protocol address, a MAC address, a network address, an Internet address, or the like. As an example, the first identifier 305 can be relied upon to establish a communication session between the user device 303 and the computing device 304 or other devices (e.g., nodes 302a, 302b, 302c, 302d) and/or networks. As a further example, the first identifier 305 can be used as an identifier or locator of the user device 303. In an aspect, the first identifier 305 can be persistent for a particular network and/or location.

In an aspect, one or more of the nodes 302a, 302b, 302c, 302d can be configured to communicate with another of the nodes 302a, 302b, 302c, 302d and/or the gateway 304 via one or more communication paths. In an aspect, the one or more communication paths can comprise one or more uninterrupted communication links, sequential links, pre-defined paths or links, and/or intervening nodes. Links can comprise a single point to point connection between two devices or network devices. Paths can comprise one or more links. As an example, one or more of the communication paths can comprise one or more of the nodes 302a, 302b, 302c, 302d. As a further example, one or more of the nodes 302a, 302b, 302c. 302d can be configured as a mesh network. In an aspect, one ore more of the communication paths can be configured to transmit one or more services.

In an aspect, the nodes 302a, 302b, 302c, 302d can be configured as a network, such as a mesh network. As an example, the gateway 304 and/or one or more nodes 302a. 302b. 302c, 302d can comprise a dual band wireless network device. As an example, a first service 307a or network can be provided. The first service 307a can be configured with a first service set identifier (SSID) (e.g., associated with a user network or private network) to function as a local network for a particular user or users. As a further example, a second service 307b or network can be provided. The second service 307b can be configured with a second service set identifier (SSID) (e.g., associated with a public/community network or a hidden network) to function as a secondary network or redundant network for connected communication devices.

In an aspect, one or more of the nodes 302a, 302b, 302c, 302d can comprise an identifier 308a, 308b, 308c, 308d. As an example, one or more identifiers can be a media access control address (MAC address). Any uniquely identifiable attribute that can be linked to a location can be used as the identifier 308a, 308b, 308c. 308d. Such attributes can comprise one or more of an IP Address, serial number, latitude/longitude, geo-encoding, custom assigned unique identifier, global unique identifier (GUID), and the like. As a further example, one or more identifiers 308a, 308b, 308c, 308d can be a unique identifier for facilitating communications on the physical network segment. In an aspect, each of the nodes 302a, 302b, 302c, 302d can comprise a distinct identifier 308a, 308b, 308c, 308d. As an example, the identifiers 308a. 308b. 308c, 308d can be associated with a physical location of the nodes 302a, 302b, 302c, 302d.

In an aspect, one or more nodes 302a, 302b, 302c, 302d can be in communication with the gateway 304a. As an example, one or more nodes 302a, 302b, 302c, 302d and/or the gateway 304a can be configured to allow one or more wireless devices to connect to a wired and/or wireless network using Wi-Fi, Bluetooth or similar standard. The gateway 304a can comprise an identifier 309a. As an example, one or more identifiers 309a can be a media access control address (MAC address). As a further example, one or more identifiers 309a can be a unique identifier for facilitating communications on the physical network segment.

In an aspect, a computing device 310 can be in communication with a network device, such as gateway 304a. As an example, the computing device 310 can be or comprise an application server, management device, auto-configuration server (ACS), AAA server, etc. In another aspect, the computing device 310 is located within a network, such as a wide area network (WAN).

In an aspect, the user device 303 can discover a beacon 312 transmitted (e.g., wirelessly) by the node 302b. The beacon 312 can comprise a beacon frame. The beacon 312 can comprise information to facilitate a connection between the user device 303 and the network device 116. In another aspect, a broadcast rate (e.g., data transmission rate, modulation rate) of the node 302b can be configured at a custom rate. As an example, the beacon 312 transmitted by the node 302b can advertise the minimum acceptable rate (e.g., data transmission rate, modulation rate) that is required connect to the node 302b. As such, if a user device 303 is in range of the beacon 312, but is not able to demodulate the beacon 312, the user device 303 is unable to discover the node 302b and may not be able to connect to the network device. As another example, if the node 302b can support the following rates (in Mbps): 1, 2, 5.5, 11, 6, 9, 12, 18, 24, 36, 48, 54, the beacon 312 can be transmitted at 18 Mbps in order to reduce the circumference that the beacon could be de-modulated. This would allow the user device 303 to use lower rates than 18 Mbps, but to not discover the broadcast and attempt connection until the user device 303 was able to de-modulate 18 Mbps. As another example, if the node 302b can support the following rates (in Mbps): 7.2, 14.4, 21.7, 28.9, 43.3, 57.8, 65, 72.2, the beacon 312 can be transmitted at 21.7 Mbps instead of 7.2 Mbps in order to reduce the circumference that the beacon could be de-modulated. As a further example, the node 302b may be configured to support various rates, such as less than or equal to 87.6 Mbps, less than or equal to 200 Mbps, less than or equal to 433.3 Mbps, less than or equal to 866.7 Mpbs, less than or equal to 6912 Mbps, or other rates or ranges. In an aspect, any rate can be used, such as rates allowed by governing agencies such as the Federal Communications Commission (FCC) and the like.

In a further aspect, the user device 303 may be required to be within a particular range of the node 302b in order to discover the beacon 312. In an aspect, the node 302b configures a transmit power specifically for the beacon 312. As an example, the beacon 312 can be transmitted at a first transmit power that is lower than a second transmit power used for the transmission of network data. As a further example, data can be transmitted at a power of 23 dBm and the beacon 312 can transmit at a power of 15 dBm. This would reduce the area in which the user device 303 could discover the broadcast of the beacon 312, but would not affect the actual data service area of the node 302b for all devices.

In an aspect, the node 302b can be configured to transmit two or more beacon 312 at different transmit power levels or rates (e.g., data transmission rates, modulation rates). The configuration of the node 302b can be based on capabilities of the node 302b, capabilities of the user device 303, class of the user device 303, service plane, class of a user, etc. Two or more user device 303 can discovery the two or more beacons 312 and associated with (e.g., connect to) the network. Accordingly, a single network device (e.g., node 302b) can provide beacons 312 for two or more user devices 303 having different capabilities. For example, a first user device 303 may discovery a beacon 312 having a rate of 18 Mbps and a second user device 303 can discovery a beacon 312 having a rate of 54 Mpbs.

In an aspect, an RSSI associated with the user device 303 can be received by the node 302b and can be returned to the user device 303. The user device 303 could use the returned RSSI to determine the quality of uplink and link-down for downlink the connection between the user device 303 and the node 302b. Other characteristics can be communicated between the user device 303 and the node 302b. As an example, information relating to a transmit power and/or a noise floor of the node 302b can be transmitted to one or more user devices 303. Using this information about the node 302b and/or the RSSI measured by the user device 303, the device can calculate a path loss. Knowing this path loss, the noise floor at the node 302b, and the characteristics of a transmitter of the user device 303, the user device 303 can calculate the probability that its uplink will be received by the node 302b. As an example, an RSSI associated with the user device 303 can be received by the node 302b and can be returned to the user device 303. The user device 303 could use the returned RSSI to determine the quality of uplink/downlink for the connection between the user device 303 and the node 302b. As an example, information relating to a transmit power and/or a noise floor of the node 302b can be transmitted to one or more user devices 303. Using this information about the node 302b and/or the RSSI measured by the user device 303, the device can calculate a path loss. Knowing this path loss, the noise floor at the node 302b, and the characteristics of a transmitter of the user device 303, the user device 303 can calculate the quality of connectivity, such as the probability that its uplink will be received by the node 302b.

In an aspect, the path loss can be calculated based on the transmission power ($P_{tx1}$) and an RSSI associated with the node 302b. As an example, the path loss can be calculated based on $P_{tx1} - RSSI = L_p$ (path loss). In another aspect, a quality of connectivity (e.g., signal-to-noise ratio (SNR)) can be calculated based on transmission power ($P_{tx2}$) associated with the user device 303, the $L_p$ and the noise floor (N) associated with the user device 303 or the node 302b. As an example, SNR can be calculated (e.g., estimated) based on $P_{tx2}$ (dBm)$-L_p$(dB)$-N$ (dBm)=SNR (dB), wherein N can be associated with one or more of the user device 303 or the node 302b. Other functions and characteristics can be used to determine path loss and/or quality of connectivity.

Figure 4:
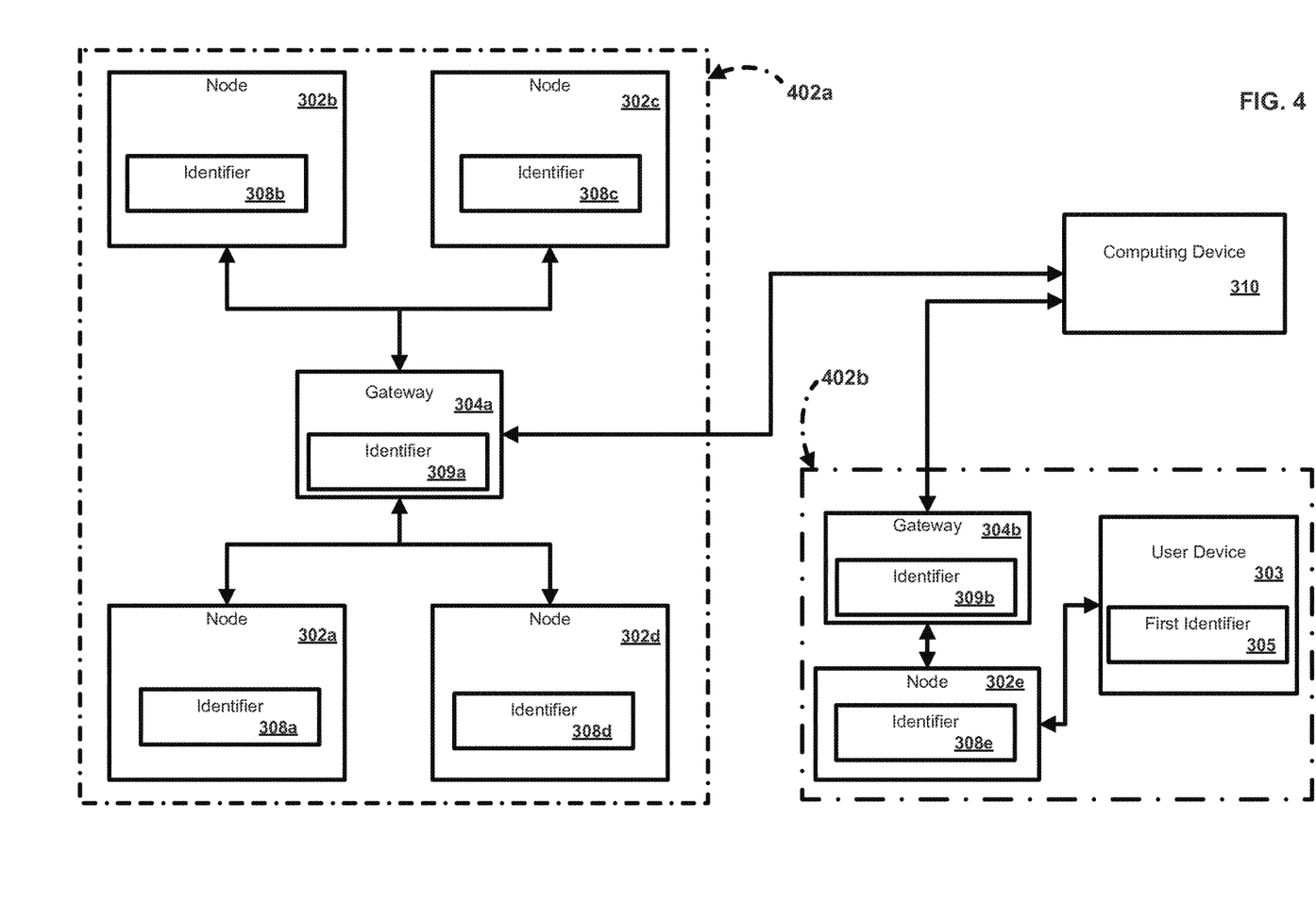
FIG. 4 is a block diagram of an exemplary system and network.

As shown in FIG. 4, a first network 402a can comprise one or more of the nodes 302a, 302b, 302c, 302d and/or the gateway 304a and a second network 402b can comprise one or more nodes (e.g., node 302e) and/or a gateway 304b. In an aspect, each of the first network 402a and the second network 402b can be associated with an identifier, such as an SSID.

In an aspect, a device such as the user device 303 can discover a beacon transmitted (e.g., wirelessly) by the node 302e and can use the beacon to connect to node 302e. However, user device 303 may not be able to discover the nodes 302a, 302b, 302c, 302d. As an example, the transmit power and/or the broadcast rate (e.g., data transmission rate, modulation rate) of the node 302e can be such that the user device 303 can receive the beacon associated with node 302e and demodulate the information contained in the beacon in order to connect to node 302e. Although the user device 303 may be in range of the nodes 302a, 302b, 302c, 302d in order to process data (if connection was enabled), the user device 303 may not be able to discover the nodes 302a, 302b, 302c, 302d because of the configurations of the advertising (e.g., beacon) of the nodes 302a, 302b, 302c, 302d. As such, the nodes 302a, 302b, 302c, 302d can selectively manage the devices (e.g., user device 303) that can connect to the nodes 302a, 302b, 302c. 302d based on whether the devices are configured to process designated minimum requirements (e.g., modulation rate, demodulation rate, transmit power, RSSI, noise floor, SNR, etc.). The nodes 302a, 302b, 302c, 302d and node 302e can be part of the same network, such as a LAN. Any of the nodes 302a, 302b, 302c, 302d, 302e can have a configurable beacon for selectively managing admission to the network. For example, one or more of the nodes 302a, 302b, 302c, 302d, 302e can be disposed in a congested area having multiple network devices. Accordingly, the one or more of the nodes 302a, 302b, 302c, 302d, 302e can be configured to restrict admission to the network based upon any number of characteristics.

Figure 5:
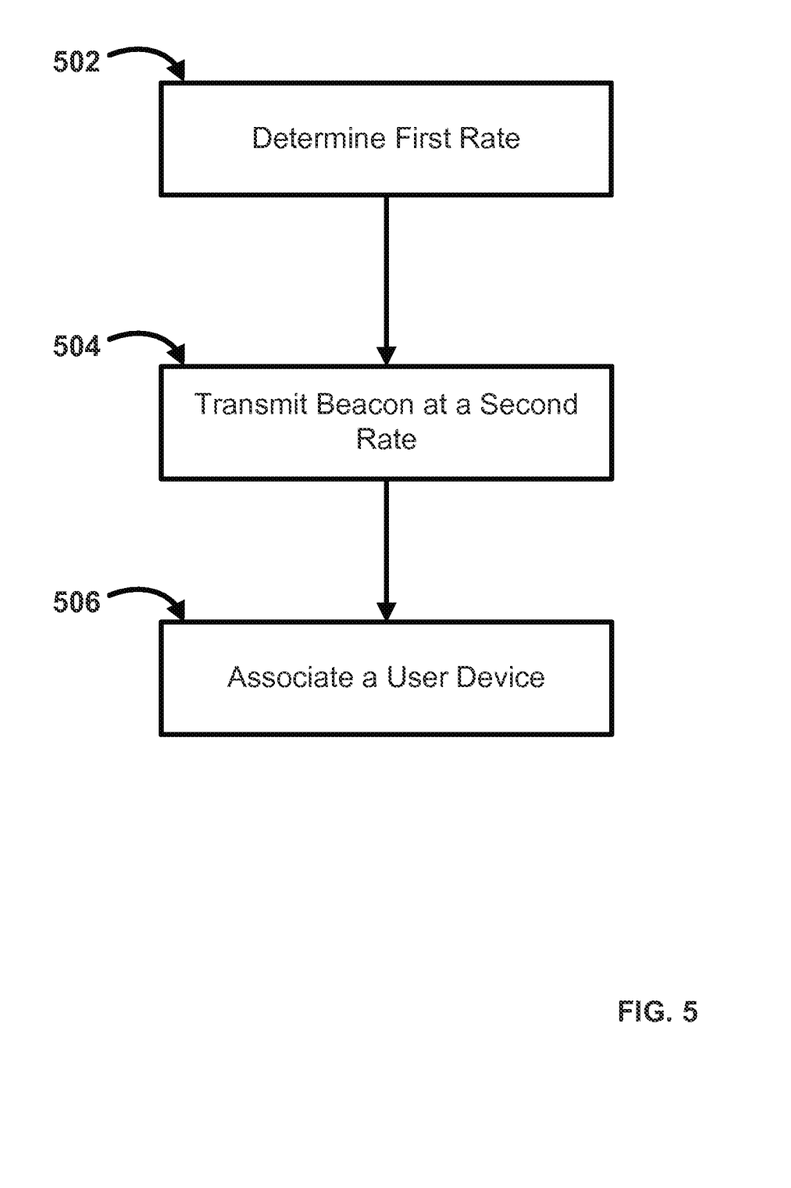
FIG. 5 is a flow chart of an exemplary method.

An exemplary method is shown in FIG. 5. In step 502, a first rate can be determined. As an example, the first rate can be a first modulation rate and/or a first data transmission rate. In an aspect, the first rate can be associated with a network device (e.g., access point, node, router, gateway, modem, etc.). As an example, the first rate can be from about 1 Mbps to about 150 Mbps, for example, 1 Mbps, 2 Mbps, 5.5 Mbps, 11 Mbps, 6 Mbps, 9 Mbps, 12 Mbps, 18 Mbps, 24 Mbps, 36 Mbps, 48 Mbps, 54 Mbps, 7.2 Mbps, 14.4 Mbps, 21.7 Mbps, 28.9 Mbps, 43.3 Mbps, 57.8 Mbps, 65 Mbps, 72.2 Mbps, 15 Mbps, 30 Mbps, 45 Mbps, 60 Mbps, 90 Mbps, 120 Mbps, 135 Mbps, and 150 Mbps. As another example, the first rate can be one of a plurality of rates supported by the network device. As a further example, the first rate can be a rate allowed by a regulating agency such as the FCC.

In step 504, a beacon can be transmitted. In an aspect, the beacon can be transmitted at a second rate. As an example, the second rate can be a second modulation rate and/or a second data transmission rate. As an example, the second rate can be greater than the first rate. As another example, the beacon can comprise a beacon frame for transmitting information relating to the network, such as, capability information, time stamp, and beacon interval, for example. As a further example, the beacon can comprise information to facilitate one or more devices (e.g., user device) connecting to a network via the network device.

In step 506, a user device can be associated with the network device. In an aspect, associating a user device with the network device can comprise connecting the user device to a network via the network device. As an example, the user device can be associated with the network device based on the beacon. As a further example, associating the user device with the network device can be conditional upon the user device being configured to support the second rate.

Figure 6:
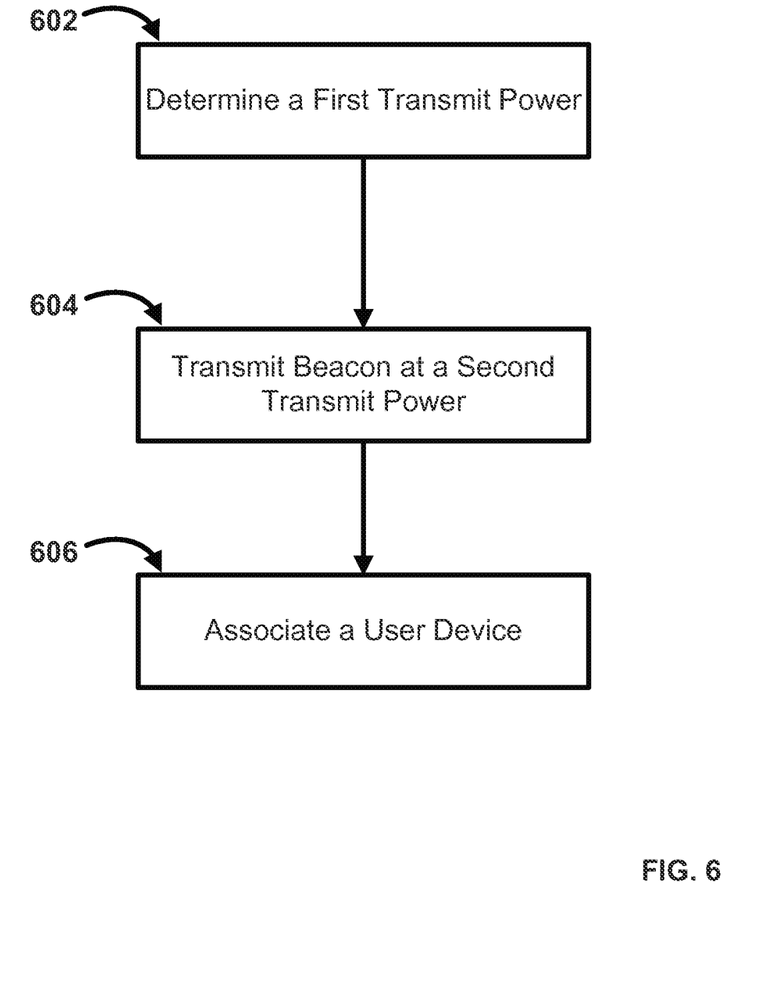
FIG. 6 is a flow chart of an exemplary method.

An exemplary method is shown in FIG. 6. In step 602, a first transmit power can be determined. In an aspect, the first transmit power can be associated with a network device. In another aspect, the first transmit power can relate to a data transfer rate supported by the network device. In a further aspect, the first transmit power can be equal to or less than the maximum transmit power allowed by the local regulation authority (e.g., +36 DBM EIRP in the US as regulated by the FCC or the territorial equivalent) and/or supported by the network device.

In step 604, a beacon can be transmitted. In an aspect, the beacon can be transmitted at a second transmit power. In another aspect, the second transmit power can be less than the first transmit power. In a further aspect, the beacon can comprise a beacon frame. The beacon can comprise information to facilitate one or more devices (e.g., user device) connecting to a network via the network device.

In step 606, a user device can be associated with the network device. In an aspect, associating a user device with the network device can comprise connecting the user device to a network via the network device. In another aspect, associating the user device with the network device can be based on the beacon. As an example, associating a user device with the network device can be dependent upon the user device being configured to receive the beacon. As a further example, associating a user device with the network device can be dependent upon the user device being disposed within a coverage range of the beacon.

Figure 7:
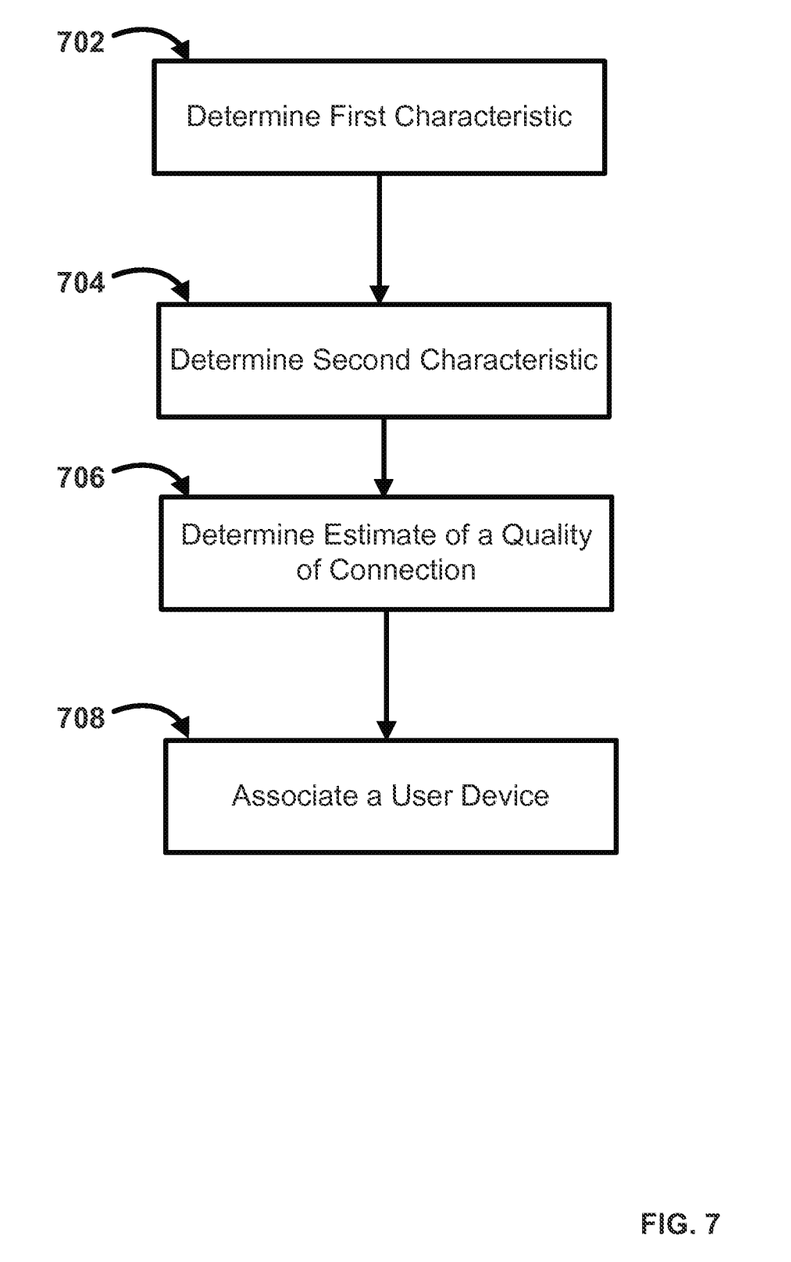
FIG. 7 is a flow chart of an exemplary method.

An exemplary method is shown in FIG. 7. In step 702, a first characteristic can be determined. In an aspect, the first characteristic can be associated with a network device. In another aspect, the first characteristic can relate to one or more of a transmit power and a noise floor. As an example, the first characteristic can comprise a path loss. In a further aspect, determining a first characteristic can comprise receiving information from the network device relating to the first characteristic.

In step 704, a second characteristic can be determined. In an aspect, the second characteristic can be associated with a user device. In another aspect, the second characteristic can relate to a received signal strength (RSSI). In a further aspect, the second characteristic can relate to one or more of a transmit power and a noise floor associated with the user device.

In step 706, an estimate of a quality of connectivity between the user device and the network device can be determined. In an aspect, the estimate of a quality of connectivity can comprise determining a probability of uplink reception by the network device. In another aspect, determining the estimate of the quality of connectivity can be based upon $$P_{tx(dBm)} - L_{p(dB)} - N_{(dBm)} = SNR_{(dB)}$$

wherein $P_{tx}$ is a transmit power associated with the user device, $L_p$ is path loss, N is noise floor associated with one or more of the network device and the user device, and SNR is a signal to noise ratio associated with the network device.

In step 708, a user device can be associated with the network device. In an aspect, associating a user device with the network device can comprise connecting the user device to a network via the network device. In another aspect, associating the user device with the network device can be based on the beacon. As an example, associating a user device with the network device can be dependent upon the user device being configured to receive the beacon. As a further example, associating a user device with the network device can be dependent upon the user device being disposed within a coverage range of the beacon.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    transmitting, by a network device, a beacon at a first transmit power less than a second transmit power used for data transfer;
    transmitting, by the network device, data indicating at least one first signal characteristic to a user device, the at least one first signal characteristic comprising a noise floor of the network device;
    connecting the user device to the network device based on the beacon if the user device is configured to receive the beacon and if an estimated connection quality calculated by the user device and based on the at least one first signal characteristic satisfies a predefined threshold; and
    transmitting data to the user device at the second transmit power.

2. The method of claim 1, wherein the network device comprises an access point for a local area network.

3. The method of claim 1, wherein the beacon comprises a beacon frame.

4. The method of claim 1, wherein the beacon comprises information to facilitate the user device connecting to a network via the network device.

5. The method of claim 1, wherein connecting the user device to the network device comprises connecting the user device to the network via the network device.

6. A method comprising:
    receiving, by a user device, a beacon transmitted from a network device at a first transmit power less than a second transmit power used by the network device for data transfer;
    receiving, by the user device, at least one first signal characteristic from the network device, the at least one first signal characteristic comprising a noise floor of the network device;

determining, by the user device, based on the first signal characteristic and at least one second signal characteristic, an estimated connection quality, the at least one second signal characteristic comprising at least one of a path loss to the network device or a transmit power of the user device;

if the estimated connection quality satisfies a predefined threshold, connecting, by the user device, to the network device using the beacon; and receiving data from the network device at the second transmit power after connection.

7. The method of claim 6, wherein the network device comprises an access point for a local area network.

8. The method of claim 6, wherein the beacon comprises a beacon frame.

9. The method of claim 6, wherein the beacon comprises information to facilitate connecting to a network via the network device.

10. The method of claim 6, wherein connecting to the network device comprises connecting the user device to a network via the network device.

11. The method of claim 6, wherein connecting the user device to the apparatus is based on the user device being within a coverage range of the beacon.

12. An apparatus comprising:

one or more processors; and memory storing processor executable instructions that, when executed by the one or more processors, cause the apparatus to:

transmit a beacon at a first transmit power less than a second power level used for data transfer;

transmit data indicating at least one first signal characteristic to a user device, the at least one first signal characteristic comprising a noise floor of the network device;

connect the user device to the network device based on the beacon if the user device is configured to receive the beacon and if an estimated connection quality calculated by the user device and based on the at least one first signal characteristic satisfies a predefined threshold; and transmit data to the user device at the second transmit power.

13. The apparatus of claim 12, wherein the apparatus comprises an access point for a local area network.

14. The apparatus of claim 12, wherein the beacon comprises a beacon frame.

15. The apparatus of claim 12, wherein the beacon comprises information to facilitate the user device connecting to a network via the apparatus.

16. The apparatus of claim 12, wherein the processor executable instructions, when executed by the one or more processors, further cause the apparatus to transmit a second beacon at a third transmit power less than the second power level used for data transfer.

17. The apparatus of claim 16, wherein the processor executable instructions, when executed by the one or more processors, further cause the apparatus to:

connect a second user device to the network device based on the second beacon if the user device is configured to receive the second beacon; and transmit data to the second user device at the second transmit power.

* * * * *